Figure 2:
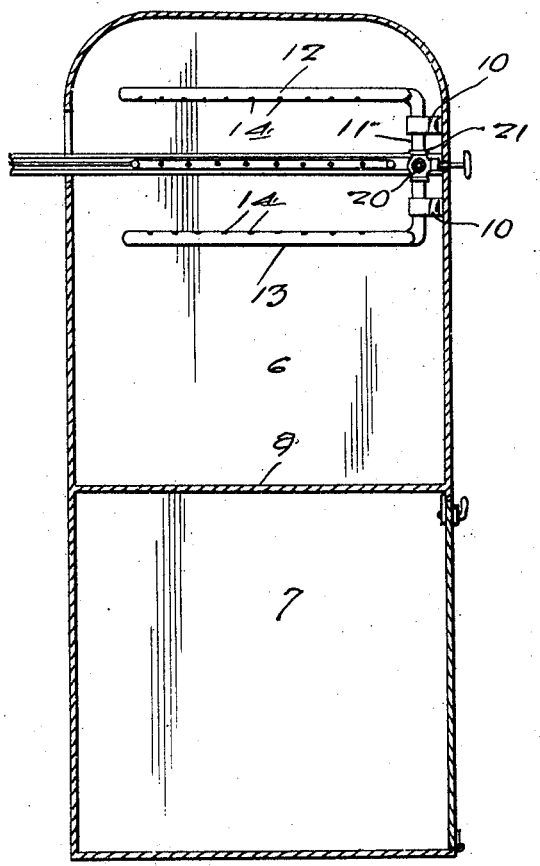

Jan. 25, 1927.
W. D. BELLAMY
1,615,356
TOASTER
Filed Jan. 4, 1926  2 Sheets-Sheet 1
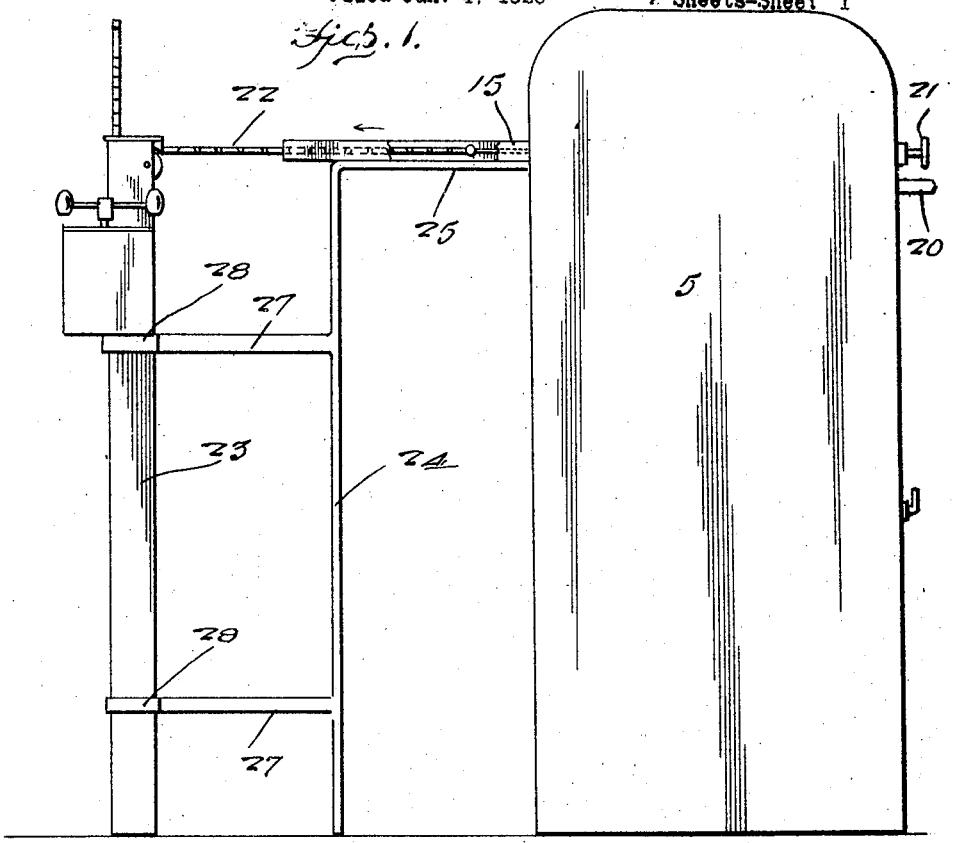
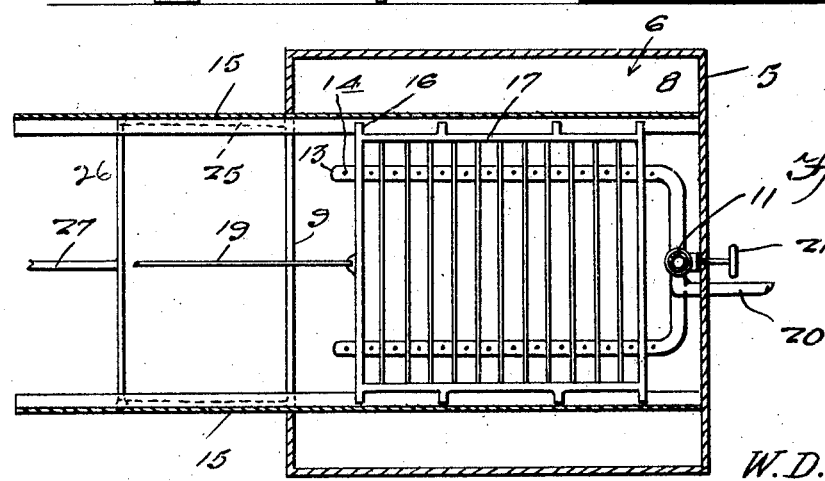
Inventor
W. D. Bellamy
By Clarence A. O'Brien
Attorney Jan. 25, 1927.　　　　　W. D. BELLAMY　　　　　1,615,356
TOASTER
Filed Jan. 4, 1926　　　2 Sheets-Sheet 2

Inventor
W. D. Bellamy
By Clarence A. O'Brien
Attorney

Patented Jan. 25, 1927.

1,615,356

UNITED STATES PATENT OFFICE.

WILLIAM D. BELLAMY, OF EL DORADO, ARKANSAS, ASSIGNOR TO SAM. STATHAKIS, OF EL DORADO, ARKANSAS.

TOASTER.

Application filed January 4, 1926. Serial No. 79,202.

The present invention relates to a toaster and aims to provide a structure which may be used in connection with a time controlled mechanism so that the bread being toasted may be pulled out of the device at the proper time.

Another important object of the invention is to provide a toasting apparatus of this nature which embodies a casing having a trackway therein with a burner structure disposed thereabove and therebelow and a frame for holding the bread which is slidably mounted in the trackway and may be engaged with the time controlled pulling mechanism.

A still further very important object of the invention is to provide a structure of this nature which is exceedingly compact and simple in its construction, efficient and convenient in its operation, strong, durable, and inexpensive to manufacture, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 3:
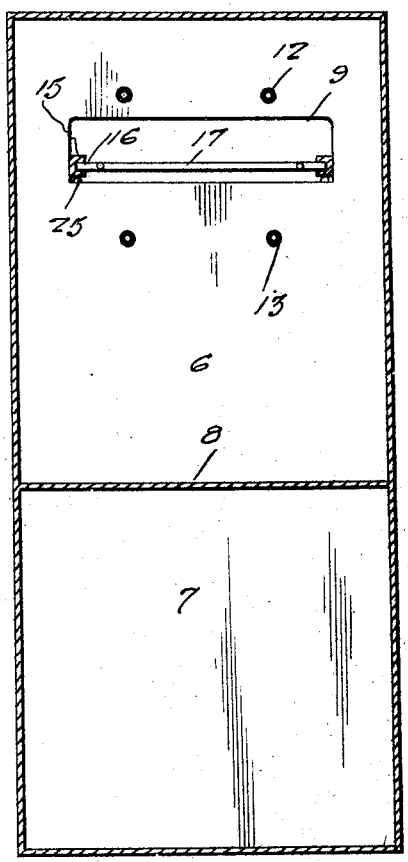
Figure 5:
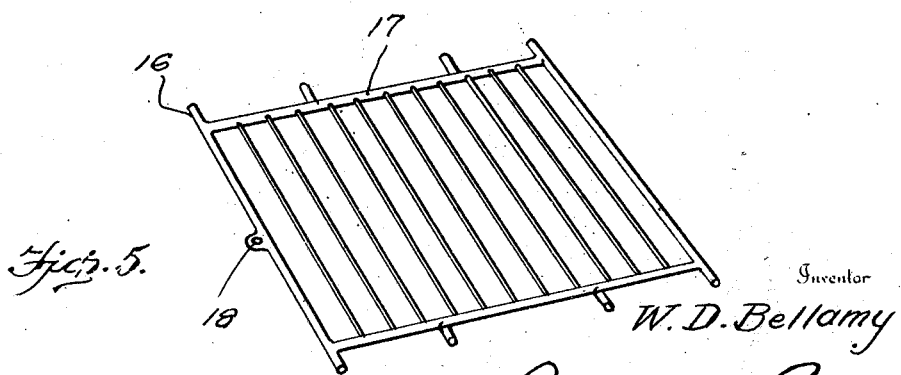

Figure 1 is a side elevation of the apparatus embodying the features of my invention, Fig. 2 is a vertical section through the device, Fig. 3 is another vertical section taken therethrough at right angles to that shown in Fig. 2, Fig. 4 is a horizontal section therethrough, and Fig. 5 is a perspective view of the supporting frame.

Referring to the drawing in detail, it will be seen that 5 designates a casing which is divided into an upper compartment 6 and a lower compartment 7 by a partition 8. One wall of the upper compartment 6 is provided with a transversely extending rectangularly shaped opening 9. On the opposite wall of the compartment 6 there is mounted in vertical spaced relation a pair of brackets 10 which support the vertical pipe 11 on a burner structure. The upper and lower ends of this pipe 11 terminate in the U-shaped burners 12 and 13 which are provided with apertures 14 opening toward each other so that the flames will be directed downwardly from the burner 12 and upwardly from the burner 13.

A pair of tracks 15 extend through the ends of the opening 9 and are substantially U-shaped in cross section to form channels into which are slidable received lugs 16 from a bread supporting frame 17 having an eye 18 at one end to which is attached a flexible member 19. The gas supply pipe for the burner is illustrated at 20 and communicates with a valve 21 incorporated in the pipe 11.

The cable 19 is attached to a chain 22 which forms part of a time controlled pulling apparatus indicated generally at 23 such as are used in egg timers now in common use and well known in this art (see Patent No. 1,209,748, December 26, 1916). In order to support the mechanism 23, I provide a pair of legs 24 which have their upper ends bent rectangularly as at 25 so as to extend under the tracks 15. The legs therefore form inverted L-shaped rods.

The legs 24 are connected by cross members 26 which have projecting therefrom arms 27 terminating in straps 28 disposed about the mechanism 23.

In using this toasting apparatus, the bread is placed on the frame 17 and this frame is then slid in the trackway formed by the tracks 15 between the U-shaped burners 12 and 13 in the compartment 16. The mechanism 23 is then set and after a predetermined amount of time has transpired, the mechanism 23 will cause the chain 22 and flexible member 19 to pulley the frame 17 outwardly of the compartment 6.

It is thought that the construction, operation, and advantages of this invention will now be clearly understood without a more detailed description thereof. The present embodiment of the invention has been disclosed in detail merely by way of example, since in actual practice it attains the features of advantage enumerated as desirable in the statement of the invention and the above description.

It will be apparent that changes in the details of construction, and in the combination and arrangement of parts may be resorted to without departing from the spirit or scope of the invention hereinafter claimed, or sacrificing any of its advantages.

Having thus described my invention, what I claim as new is:—

An apparatus of the class described including a pair of inverted L-shaped rods having their upper horizontal portions extending in parallelism and in the same direction, and their vertical portions disposed in spaced relation, members connecting the vertical portions, and arms projecting from the members in a direction opposite to the direction in which said upper horizontal portions extend, said arms terminating in loops.

In testimony whereof I affix my signature.

WILLIAM D. BELLAMY.